(12) United States Patent
Haji Abolhassani et al.

(10) Patent No.: US 12,499,177 B1
(45) Date of Patent: Dec. 16, 2025

(54) FAST AND SCALABLE EXPLANATION OF MODEL PREDICTIONS WITH DYNAMIC GRADIENT ESTIMATION

(71) Applicants: Iman Haji Abolhassani, Mountain View, CA (US); Alvin Derek Henrick, Dublin, CA (US)

(72) Inventors: Iman Haji Abolhassani, Mountain View, CA (US); Alvin Derek Henrick, Dublin, CA (US)

( * ) Notice: Subject to any disclaimer, the term of this patent is extended or adjusted under 35 U.S.C. 154(b) by 867 days.

(21) Appl. No.: 17/832,391

(22) Filed: Jun. 3, 2022

Related U.S. Application Data

(60) Provisional application No. 63/197,197, filed on Jun. 4, 2021.

(51) Int. Cl.
 *G06F 18/21* (2023.01)
 *G06F 18/211* (2023.01)
 *G06N 20/00* (2019.01)

(52) U.S. Cl.
 CPC .......... *G06F 18/217* (2023.01); *G06F 18/211* (2023.01); *G06N 20/00* (2019.01)

(58) Field of Classification Search
 CPC ...... G06F 18/217; G06F 17/16; G06F 18/211; G06N 3/006; G06N 3/084; G06N 20/00; H04L 41/0895; H04L 41/40; H04L 41/046; H04L 43/0817; H04L 43/0852; H04L 41/5009; H04L 41/5019; H04L 41/0806; H04W 16/18; H04W 24/02
 See application file for complete search history.

*Primary Examiner* — Pei Yong Weng
(74) *Attorney, Agent, or Firm* — Plager Schack LLP; Mark H. Plager; Alexis Saenz

(57) ABSTRACT

A method provides an accurate machine learning model output explanation. A symmetric path from a reference point to an input data point is determined. The symmetric path represents contributions from features in a feature space of a prediction model. The contribution of the intercept is calculated as the machine learning model output value at the reference point in the feature space. The symmetric path is updated based on the calculated contributions. An encircling path set is generated from the updated base path based on the desired accuracy threshold. A gradient is calculated for each path. Intermediary points between the reference point and the input data point are dynamically added. The added points are symmetric about the symmetric path. A determination of whether a threshold accuracy of prediction is produced by the prediction model is made. The dynamic addition of intermediary points is iterated until the threshold accuracy is reached.

10 Claims, 3 Drawing Sheets

12,499,177 B1

FAST AND SCALABLE EXPLANATION OF MODEL PREDICTIONS WITH DYNAMIC GRADIENT ESTIMATION

CROSS-REFERENCE TO RELATED APPLICATIONS

This application claims benefit under 35 U.S.C. § 119 (e) of U.S. Provisional Application having Ser. No. 63/197,197 filed Jun. 4, 2021, which is hereby incorporated by reference herein in its entirety.

BACKGROUND

The embodiments herein relate generally to machine learning and more particularly, to a fast and scalable explanation of model predictions with a dynamic approach to contribution gradient estimation.

Prediction explanation has direct impacts on enhancing machine learning model transparency, fairness, unbiasedness, reliability, robustness, adoption, actionability, and debugging. Reasons such as these highlight the importance of explainable AI and the development of methods to give humans insight as to why and how a model makes specific predictions.

Design Considerations

Explanation scale: A prediction explainer may be able to explain a single prediction, or a batch of predictions, or the prediction on the whole population. Each of these have their use-cases. Prediction explanation models often make a compromise between local and global prediction explanation fidelity.

Interpretability: An explanation based on sophisticated metrics, which themselves need complimentary explanations, may not be quite useful. Compromises often need to be made to find the sweet spot between fidelity to predictions and interpretability.

Current Approaches:

Numerous methods for prediction explanation have been proposed some focusing on specific model types, e.g., ensemble trees, and some more general purpose. Two of the notable black-box model explainer methods are LIME and SHAP. The focus of this invention is the black-box approach.

SUMMARY

In one aspect of the subject technology, a computer implemented method for accurate machine learning model output explanation is provided. The method includes a computer processor determining a symmetric path from a reference point to an input data point (the target point), wherein the symmetric path represents a trajectory within the feature space of a prediction model. The prediction value at the reference point in the feature space is calculated as the contribution of the intercept. The symmetric path is updated based on the calculated sequential feature contributions during the transition from the reference point towards the final point. An encircling path set is generated at each point along the symmetric path. A gradient is calculated for each path in the encircling path set. The gradient represents feature contributions to the change of output along the path. Intermediary points between the reference point and the input data point are dynamically added. The added intermediary points are symmetric around the symmetric path. A determination of whether a threshold accuracy of prediction is produced by the prediction model is made. The dynamic addition of intermediary points is iterated until the desired accuracy threshold is reached.

In another aspect, a computer program product for improving the accuracy of a machine learning model output explanation is provided. The computer program product includes one or more computer readable storage media, and program instructions collectively stored on the one or more computer readable storage media. The program instructions include determining a symmetric path from a reference point to an input data point, wherein the symmetric path is used to calculate the contributions of features in a feature space of a prediction model, the reference point in the feature space is considered as the intercept and the model prediction value at this point is considered the contribution of the intercept. An encircling path set is generated for each point on the symmetric path. A gradient is calculated for each path in the encircling path set. The gradient represents feature contributions. Intermediary points between the reference point and the input data point are dynamically added. The added intermediary points are symmetric around the symmetric path. A determination of whether a threshold accuracy of prediction is produced by the prediction model is made. The dynamic addition of intermediary points is iterated until the desired accuracy threshold is reached.

BRIEF DESCRIPTION OF THE FIGURES

The detailed description of some embodiments of the invention is made below with reference to the accompanying figures, wherein like numerals represent corresponding parts of the figures.

DETAILED DESCRIPTION OF CERTAIN EMBODIMENTS

Overview

Figure 1:
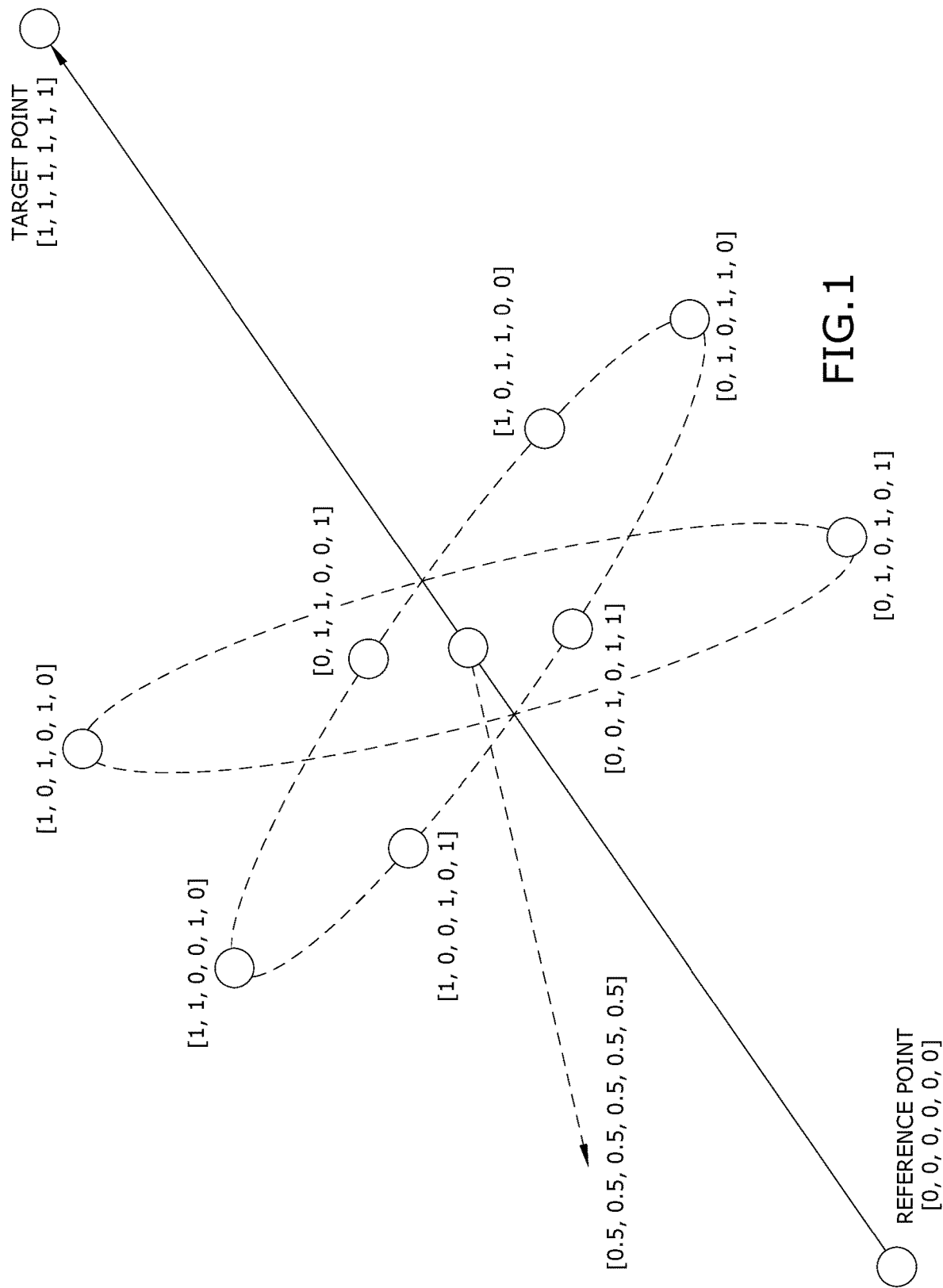
FIG. 1 is a diagrammatic view of two encircling mid-point-sets symmetrically encircling a point according to an embodiment of the subject technology.

In general, and referring to the Figures, embodiments of the disclosed subject technology provide a process for model predictions using dynamic gradient estimation (DyGEst). DyGEst™ is based on the premise that in order to estimate average feature contributions with a good enough accuracy, all feature permutations are not necessarily required. Instead, a subset of permutations that are symmetrically and dynamically selected can provide a comparable level of accuracy in a fraction of computations. In some embodiments, the level of accuracy at an iteration may be checked. If a threshold accuracy is not reached, the process dynamically uses more symmetric permutations to enhance the results. The threshold of accuracy may be assessed for example, based on the dynamic estimate of the local linearity of the prediction model and the corresponding partial feature contributions to the outcome (the gradient) at each iteration and hence the name Dynamic Gradient Estimation (DyGEst). Embodiments may be implemented for Python® estimators (GLMs, ensemble trees including XGB, etc.) as well as Apache Spark™ MLlib for distributed explanation on larger datasets. However, it will be understood that other applications are contemplated within the scope of the disclosure herein. The implementation of DyGEst is not limited to the aforementioned coding languages and encompasses all coding languages as the software is merely a means to represent the process.

Definitions

"Gradient": the amount of change of the prediction output while traversing points along paths from the reference point to the input data point. "Gradient" may be used synonymously with feature contributions, as the sum of feature contributions add up to the incremental changes along the path.

"Intercept": The "intercept" is the same as the reference point (or reference input). If the reference input is (0, 0, 0, 0, 0, 0), the corresponding model prediction for the reference input may be considered as the "contribution of the intercept".

"Transitions"/"Transitioning": "Transitioning" means moving from one point on the path to the next one. Each transition may result in a change in the model prediction value and hence a change in feature contributions. Methodology Referring now generally to FIGS. 1-3, a process for model predictions using dynamic gradient estimation is shown (See FIG. 3) accompanied by diagrams of encircling paths for model predictions according to illustrative embodiments. The subject process is used in machine learning based modeling. As a model is being built and refined, the process (which is computer processor based), the input data features used to arrive at a result are computed at each iteration and the results may be re-used to refine the accuracy of explanation of the results.

On a high level, the process includes calculating feature contributions to a prediction based only on the initial (base or inactive) state of features and their final (active) state. The accuracy of the feature contributions may be assessed. The process may stop if the accuracy is good enough. Otherwise, symmetric mid-point permutations may be added to enhance the estimates. The mid-point serves as a steppingstone between the reference point and the final point. For example, feature contributions may be calculated to get from the reference point to the mid-point, and then from the mid-point to the final point. This enhances accuracy. The symmetric mid-points are selected based on a novel approach in a binary search fashion. In some embodiments, permutations may be added, and mid-points selected until the desired accuracy is reached.

In FIG. 1, the diagram shows a six coordinate system for explaining a machine learning model output. The six coordinates represent six features considered for a model. Six features represent a six dimensional space. As will be understood, more or less features may be involved in the process. In some embodiments, six data points may be a default number used. However, as iterations are generated, the computer processor may dynamically select more or less features and the features selected in future runs may be in different coordinate spaces. As will be appreciated, the permutations for six features exceed what can be manually calculated by even a team of persons because the time required would be impractical. This is further exacerbated for a greater number of features.

The reference point (0,0,0,0,0,0) represents the base case or starting point. The target point (1,1,1,1,1,1) represents the active case or desired level of result. The line drawn between the target point and the starting point represents the symmetric path (described below). Under the subject technology, a plurality of features (represented by their respective coordinates) in the feature space are selected. In an illustrative embodiment, the "positions" of the selected features may be based on symmetry around the line between the starting point and the target point, (the symmetric path). For example, each feature selected may be equidistant from the line as each other point selected. A mid-point (0.5, 0.5, 0.5, 0.5, 0.5, 0.5) represents a hypothetical value from which each selected feature is measured. The mid-point value may be the point around which symmetry is determined. The mentioned symmetric mid-point represents points that are half-active. In reality such a point does not exist as features are either active or inactive. The encircling points are selected in a fashion that their average represents the hypothetical mid-point.

Figure 2:
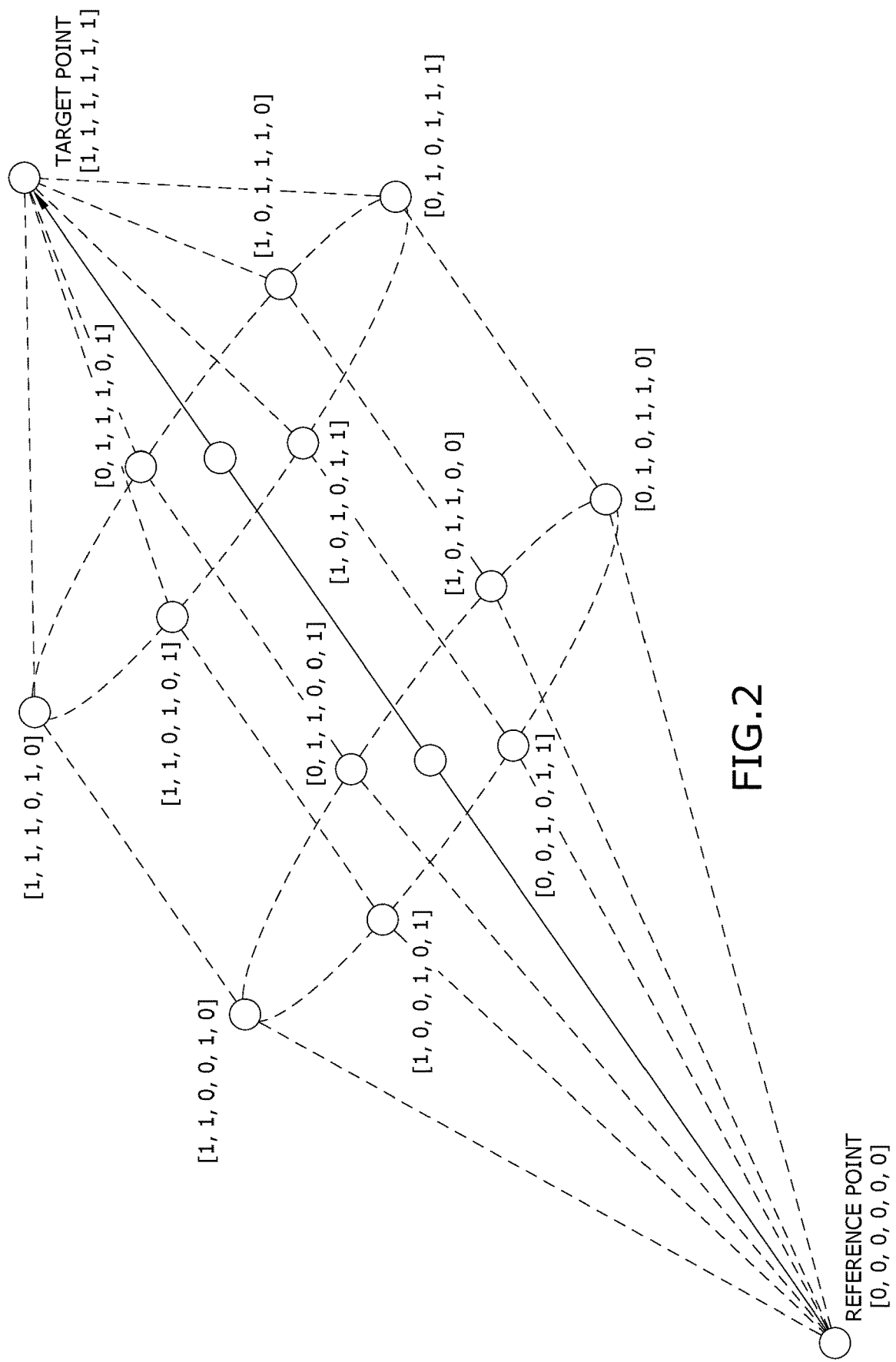
FIG. 2 is a diagrammatic view of a set of encircling paths connecting a reference point to a target point according to an embodiment of the subject technology.

As shown in FIG. 2, different paths from the reference point and the target point may be used. As will be discussed in more detail below, some embodiments may increase the number of "mid-points" between the reference point and the target point. FIG. 2 shows that the subject technology may generate different gradients between the reference point and target point. Each gradient may use two intermediary coordinates as "mid-points." As can be seen, multiple gradients may be determined. Mid-points may be grouped by symmetry to determine first and second mid-points for the central gradient between the reference point and the target point.

As will be appreciated, the process using a selected number of features that are symmetric around a point in the feature space reduces the number of calculations needed to generate a comparable if not almost equal result in explaining a prediction model. Accordingly, by using a substantially smaller number of input data points, the subject process provides a substantial reduction in computing power and time.

Figure 3:
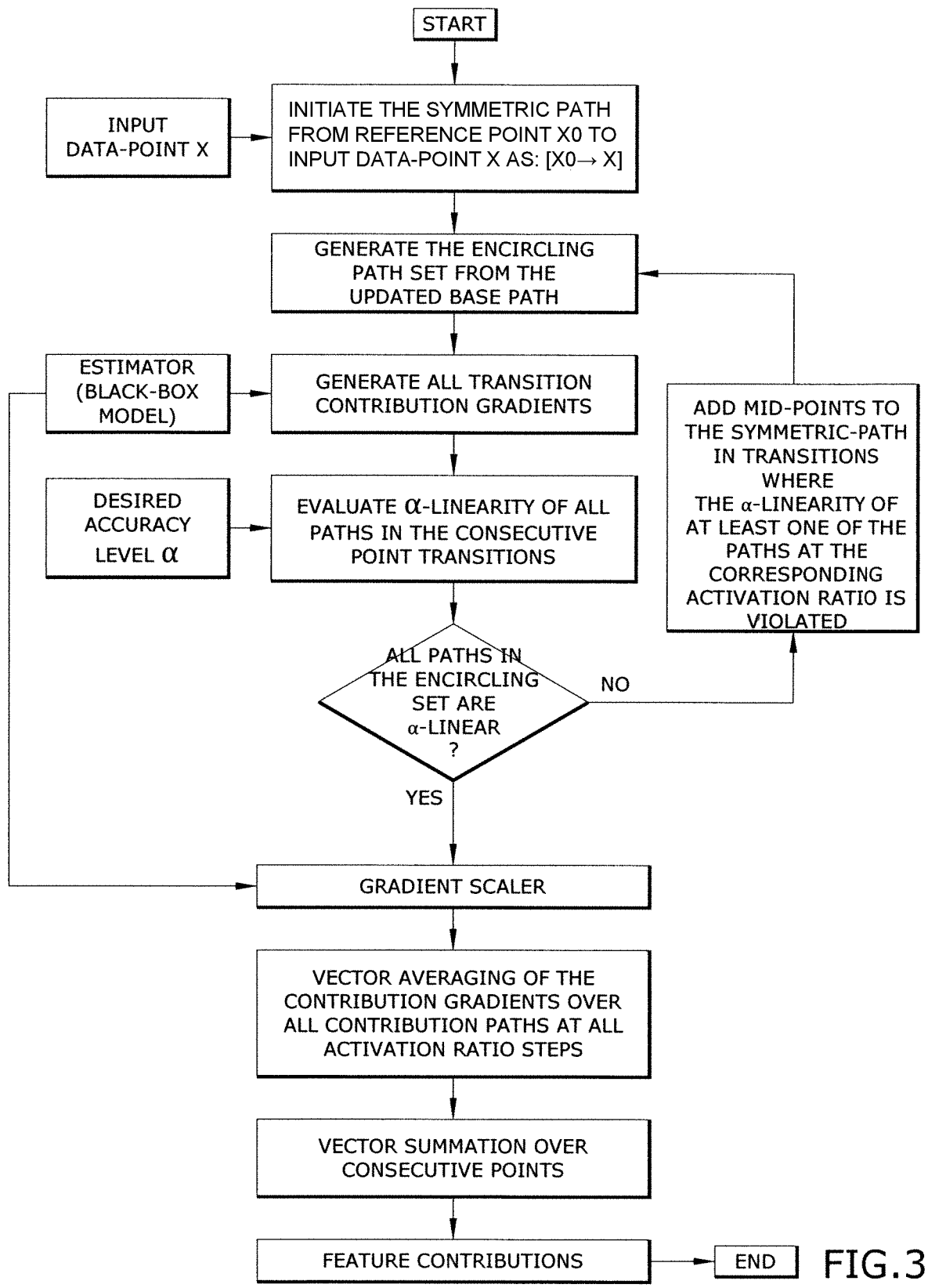
FIG. 3 is a flowchart of a process for prediction explanation according to an embodiment of the subject technology

Referring back to the process shown in FIG. 3, in an illustrative embodiment, the steps include: receiving input data point "X". The data point "X" represents the target value. An explanation engine, via a computer processor may initiate a process that determines a symmetric path from a reference point "$X_0$" to the input data point "X". For example, the explanation engine may calculate the contribution of the intercept as $f(X_0)$. The explanation engine may be a software module including a set of computer instructions executed by a computer processor in a computing device. The explanation engine may generate a new point on the base path along with its encircling path set to improve the explanation accuracy. For example, in some embodiments, the explanation engine dynamically generates an $\alpha$-linear set of encircling paths connecting $X_0$ to the desired target point X. The explanation engine calculates the feature contributions gradient for each path in the encircling path set. The explanation engine may evaluate the $\alpha$-linearity of all paths (defined below). In some embodiments, the explanation engine may determine whether all paths (or in some embodiments, a minimum number of paths) in the encircling set are $\alpha$-linear. If not enough of the paths are $\alpha$-linear, the explanation engine may automatically and/or dynamically add intermediary points to the base path along with its encircling paths. The added intermediary points selected may be based on determining transitions where the $\alpha$-linearity of at least one of the paths at the corresponding activation ratio is violated. After intermediary points are added, a subsequent iteration repeats the process from the step of generating the encircling paths.

When the paths in the encircling set meet the $\alpha$-linearity condition, some embodiments may include a gradient scaler module that provides gradient scaling. When an α-linearity condition is met, it means that the sum of feature contributions is close enough to the amount of change in the prediction during transitions towards the target point. The gradient scaler scales the feature contributions so that this sum matches the total change exactly. An embodiment of gradient scaling is described below. The explanation engine may vector average all of the resulting contribution gradients to produce the overall feature contributions to the prediction. In some embodiments, all activation steps are considered. The explanation engine may sum vectors over consecutive points. The vector summation results may be used to determine the contributions from feature points in the explanation of the model.

The subject technology leverages two main ideas to significantly reduce the search space and the corresponding computational complexity of SHAP:

A) reduces the number of mid-points in the paths from the reference point to the target point by dynamically adding mid-points when needed.

B) introduces the concept of "symmetric paths," which produce fair feature contributions without exploring all possible paths from the reference point to the target point. Fair means, since the paths from the reference point to the target point are symmetric, all features are treated the same, and there is no systematic bias in this analysis.

SHAP calculates the contribution of feature i to path z,' towards target point X as:

$$\phi_{i,B}(f) = f(B) - f(B \backslash i) \quad \text{Eq. 1}$$

which is the outcome prediction after feature i is activated (point B) minus the prediction before that (point B\i). SHAP generates all possible paths and, as a result, at each step of every path only one additional feature is activated. Since the aim of the proposed process estimates the gradients using a sub-set of paths where more than one feature may be activated at each step, gradients may be calculated in a more general way:

$$\nabla f_{A \to B} = [\phi_{1,A \to B}(f), \phi_{2,A \to B}(f), \ldots, \phi_{i,A \to B}(f)] \quad \text{Eq. 2}$$

where $\nabla f_{A \to B}$ is the gradient of feature contributions when moving from point A to point B along a path from the reference point to the target point, and $\phi_{i,A \to B}(f)$ is the contribution of feature i to this change, defined as:

$$\phi_{i,A \to B}(f) = \quad \text{Eq. 3}$$
$$\begin{cases} f(B) - f(B \backslash i) & \text{if feature } i \text{ was activated in the transition from } A \text{ to } B \\ 0 & \text{otherwise} \end{cases}$$

B\i is a point similar to B for all features except for feature i which is deactivated in B\i. For example, when going from mid-point M1=[1, 0, 0, 0, 0, 0] to M2=[1, 0, 1, 0, 1, 0], the gradient of change for f in this transition is $$\nabla f_{M1 \to M2} = [0, 0, f([1,0,1,0,1,0]) - f([1,0,0,0,1,0]), 0, f([1,0,1,0,1,0]) - f([1,0,1,0,0,0]), 0] \quad \text{Eq. 4}$$

The same equation can be used to estimate the contribution gradients when transitioning from the reference-point (X0) or to the target-point (X).

An alternative to Eq. 3 may be used to improve accuracy by replacing $f(B) - f(B \backslash i)$ by $(f(B) - f(B \backslash i) + f(A/i) - f(A))/2$, where A/i is a point similar to point A for all features except for feature i which is activated in A/i.

Characteristics:

This gradient is path dependent.

The gradient can have multiple non-zero dimensions.

If there is a linear additive relationship between the activating features within the transition between points A and B, the piece-wise sum of the elements of the contributions gradient is equal to the difference of model predictions at points A and B:

$$\Sigma_i (\nabla f_{A \to B})_i = f(B) - f(A) \quad \text{Eq. 5}$$

where $(\nabla f_{A \to B})_i$ represents the i-th element of $\nabla f_{A \to B}$.

If the relationship between activating features is semi-linear, characteristic D becomes:

$$\Sigma_i (\nabla f_{A \to B})_i \cong f(B) - f(A) \quad \text{Eq. 6}$$

In the case that only one feature changes between points P and M, Eq. 6 converges to Eq. 5.

If there is only one feature activation between points A and B, Eq. 5 holds true for the transition.

Flexible Accuracy Through α-Linearity

Eq. 6 can be used to quantify the quality of contributions gradient estimation between points M1 and M2: If the sum of the gradient elements is not 'close enough' to the prediction difference between points A and B, we can improve the gradients by introducing more mid-points in between these two points. In the extreme case, we will have enough mid-points that each transition between those mid-points only requires the activation of one new feature, enforcing Eq. 6.

The α-Linear Transition

In order to have a systematic criterion for evaluating gradient accuracy (and the sufficient density of path mid-points), we can turn Eq. 6 into an equality:

$$f(B) - f(A) - \varepsilon^- \leq \Sigma_i (\nabla f_{A \to B})_i \leq f(B) - f(A) + \varepsilon^+ \quad \text{Eq. 7}$$

where $\varepsilon^+$ and $\varepsilon^-$ are both non-negative and put an upper and lower-bound on the acceptable gradient sum. To simplify the inequality, we can write it using only one multiplicative extra variable α as:

$$\begin{cases} \alpha(f(B) - f(A)) \leq \sum_i (\nabla f_{A \to B})_i \leq \alpha^{-1}(f(B) - f(A)) & \text{if } (f(B) - f(A)) > 0 \\ \alpha^{-1}(f(B) - f(A)) \leq \sum_i (\nabla f_{A \to B})_i \leq \alpha(f(B) - f(A)) & \text{if } (f(B) - f(A)) < 0 \end{cases} \quad \text{Eq. 8}$$

where $0 < \alpha \leq 1$. This variable may be called the gradient accuracy variable. The higher the value of α, the more accurate the estimated gradients. At the maximum value of α=1, Eq. 8 turns into Eq. 5. Later we will use this variable to adjust the compromise between computational efficiency and explanation accuracy. If the transition between two consecutive points whose gradient satisfies Eq. 8 for a desired a level is called an "α-linear transition". α-linearity as defined in Eq. 8 is one way to quantify the linearity level of the transition. This proposal covers other means of assessing the linearity level of the transition between points as well, whether expressed using only one parameter (such as α) or more (for example having two parameters for the upper and lower bounds of Eq. 8 instead of 1). The means to quantify the linearity of the transition propagates to the dynamic path generation process (defined below) as well.

The α-Linear Path

A path with points connecting the reference-point $X_0$ to the target-point $X$, where all consecutive transitions are α-linear is called an α-linear path.

Generating an α-Linear Path

An α-linear path may be generated between from point $X_0$ to point $X$ using the following algorithm:

Initiate the path as P: $X0 \rightarrow X$

Go through the transitions in the path and split any transition that is not α-linear into two transitions by adding a mid-point (described below) to the path.

Repeat the previous step until all transitions are α-linear.

When only one feature activation is present between points A and B of the contributions gradients, the contributions according to Eq. 5 ensures that the algorithm above will converge for any value of $0 < \alpha \leq 1$.

Generating a mid-point to split the transition between points A and B can be done as:

For feature values that do not change between A and B, use the common value for the mid-point.

For features that are activated in the transition between A to B, activate half of them for the mid-point. The selection of which half can be random.

For example, the following are all acceptable mid-points between points A=[0, 0, 0, 0, 1, 1, 0] and B=[1, 1, 1, 1, 1, 1, 0]:

M1=[1, 1, 0, 0, 1, 1, 0], M2=[1, 0, 1, 0, 1, 1, 0], M3=[0, 0, 1, 1, 1, 1, 0], . . .

Gradient Scaling

For an α-linear transition between points A and B, an embodiment of transition gradient scaling may be:

$$\nabla f^s_{A \rightarrow B} = \gamma \cdot \nabla f_{A \rightarrow B} \qquad \text{Eq. 9}$$

Where γ is the scaling factor defined as:

$$\gamma = \left( \frac{f(B) - f(A)}{\sum_i \nabla f_{A \rightarrow B}} \right) \qquad \text{Eq. 10}$$

Hence, the sum of the elements of the scaled gradient vector is:

$$\sum_i (\nabla f^s_{A \rightarrow B})_i = f(B) - f(A) \qquad \text{Eq. 11}$$

Feature Contributions to the Overall Path

Lemma 1:

For an α-linear path consisting of m+1 points $P_0, P_1, P_2, \ldots, P_m$ that form an incremental path between the reference point $P_0$ and a target point $Pm$, the set of scaled contributions gradients $$\nabla f^s_{P(j-1) \rightarrow Pj} \quad 1 \leq i \leq m,$$

where j is the point number can be generated. The feature contributions gradient to this path may be defined as:

$$\nabla f_{Pm} = \sum_{j=1}^{m} \nabla f^s_{P(j-1) \rightarrow Pj} \text{ where } \sum_{j=1}^{m} \nabla f^s_{P(j-1) \rightarrow Pj} \qquad \text{Eq. 12}$$

where $\sum_{j=1}^{m} \nabla f^s_{P(j-1) \rightarrow Pj}$ is the vector summation of all scaled transition gradients within the path. Following the chain application of Eq. 11, $$\Sigma_i (\nabla f_{Pm})_i = f(P_m) - f(P_0) \qquad \text{Eq. 13}$$

where $\Sigma_i (\nabla f_{Pm})_i$ is the piece-wise sum of all of the elements in the overall feature contributions gradient. Eq. 13 can be re-written as:

$$f(P_m) = f(P_0) + \Sigma_i (\nabla f_{Pm})_i \qquad \text{Eq. 14}$$

which is essentially the additive feature contributions paradigm, with feature contributions as:

$$\phi_0(f) = f(P_0) \text{ and } \phi_i(f) = (\nabla f_{Pm})_i \qquad \text{Eq. 15}$$

where $(\nabla f_{Pm})_i$ is the i-th element of the overall feature contributions gradient vector, i.e., the overall contribution of the i-th feature.

The Symmetric-Path

Consider an imaginary symmetric path that directly connects the reference-point to the target-point in a straight line: Symmetric-Path SP1:

$X_0$=[0,0,0,0,0,0]—>S1=[1/6,1/6,1/6,1/6,1/6,1/6]—>S2=[2/6,2/6,2/6,2/6,2/6,2/6]—>S3=[3/6,3/6,3/6,3/6,3/6,3/6]—>S4=[4/6,4/6,4/6,4/6,4/6,4/6]—>S5=[5/6,5/6,5/6,5/6,5/6,5/6]—>X=[1,1,1,1,1,1].

This path consists of a series of symmetric points S1 to S5. A "symmetric point" is a point in which all non-zero elements are equal. We call this equal value the activation ratio A. If the transition feature contributions are calculated within these points, the result would be symmetric to all contributing (or non-zero) features, which may make the estimated contributions balanced and possibly save the need from traversing all possible paths.

Lemma 2:

If function $f$ has a 'smoothly varying' gradient within the feature space, it can be assumed that:

$$\nabla f_{\bar{S}} \sim \overline{\nabla f_S} \qquad \text{Eq. 16}$$

where S is a set of points in the input feature space and $\bar{S}$ is their vector average. This smoothness can be quantified by introducing an upper bound for the Lipschitz-continuity coefficient K of the Hessian of $f$. Eq. 16 expresses that for a smoothly varying function, the gradient of the function at the average of a set of points approaches the average of gradients at those points. The smoother (slower) the gradient variations, the closer the two values. We will use this simplifying assumption to generate the gradients of our symmetric path and address the issues raised above. For instance, if we are interested in calculating the gradients in point S1 above, we can represent it using the set of points C1 as:

C1={[1,0,0,0,0,0],[0,1,0,0,0,0],[0,0,1,0,0,0],[0,0,0,1,0,0],[0,0,0,0,1,0],[0,0,0,0,0,1]}

Since $S1 = \overline{C_1}$=[1/6, 1/6, 1/6, 1/6, 1/6, 1/6], using Lemma 2, the gradient (feature contributions) at point S1 approaches the average of gradients of mid-points in C1 which are calculable.

Activation Ratio 2:

The common value for the contributing features in the symmetric mid-point is called the activation ratio (e.g., $\lambda = 1/6$ in the previous example). This value represents the proportion of activated contributing features along the path from the reference point to the target point. For an input with N contributing features, all Shapley paths start from the reference point and progressively activate one feature at a time until all N are active and we reach the target point. In activation ratio terms, we move from $\lambda=0$ at the reference point X0 to $\lambda=1$ at the target point in steps of 1/N. The value N is the count of the total contributing (active) features at the target point X. For instance, for the target point X=[1, 1, 1, 1, 1, 0], fractional values are $\lambda=0$, 1/5, 2/5, 3/5, 4/5, and 1 corresponding to the symmetric path with the following symmetric points:

Symmetric-Path SP2:

$$X0=[0,0,0,0,0,0] \to S1=[1/5,1/5,1/5,1/5,1/5,0] \to S2=[2/5,2/5,2/5,2/5,2/5,0] \to S3=[3/5,3/5,3/5,3/5,3/5,0] \to S4=[4/5,4/5,4/5,4/5,4/5,0] \to X=[1,1,1,1,1,0].$$

The Encircling Set of a Symmetric Point:

The "encircling set" around a symmetric point is a set of points with binary elements (0 or 1, i.e., inactive or active) whose vector mean is equal to the symmetric point. One way to generate an encircling set is through generating the cyclic set.

The Cyclic Set of a Point:

For a point M that lies on a path that connects the reference point X0 to a target point X, we define its cyclic set as the set of points that are cyclic rotations of all elements in M that are active (contributing) in X. For example:

For point M=[1, 1, 0, 0, 0, 0] and target-point X=[1, 1, 1, 1, 1, 1], the cyclic set is {[1, 1, 0, 0, 0, 0], [0, 1, 1, 0, 0, 0], [0, 0, 1, 1, 0, 0], [0, 0, 0, 1, 1, 0], [0, 0, 0, 0, 1, 1], [1, 0, 0, 0, 0, 1]}.

For the same M=[1, 1, 0, 0, 0, 0] but the target-point X=[1, 1, 1, 1, 0, 0], the cyclic set is {[1, 1, 0, 0, 0, 0], [0, 1, 1, 0, 0, 0], [0, 0, 1, 1, 0, 0], [1, 0, 0, 1, 0, 0]}. In this case only the first four features are rotating as the last two do not contribute to the target-point.

The cyclic set is a special case of an encircling set.
The cyclic set has two useful features:
The activation ratios for all points in the cyclic set of point M are the same as that of M's.
The vector average of the points in the cyclic set is the symmetric point S in the direction of the target point X with the activation ratio equal to that of M.

As a result, if $f$ is a smoothly varying function as described in Lemma 2, the contribution gradient at the symmetric point S is the mean of the contribution gradients of the cyclic set. Another important result is that the mean gradient that is calculated this way tends to the same value at this activation ratio for all possible paths. This significantly reduces the number of paths to explore for estimating the overall feature contributions. FIG. 2 provides a visual representation of how two mid-point-sets with the same activation ratio both surround the same fractional-mid-point in their center.

Generating the Cyclic Set of a Path

The same concept of generating a cyclic set of points can apply to whole paths. For a path that consists of multiple points from the reference point X0 to the target point X, we can generate the cyclic set of paths by simultaneously performing cyclic rotations of the contributing features (i.e., features that contribute to X) on all points in the path. For example, for the path P1:

P1:

$$X0=[0,0,0,0,0,0] \to M1=[0,1,1,0,0,0] \to M2=[1,1,1,1,0,0] \to X=[1,1,1,1,1,0],$$

the cyclic paths set is:

$$\{X0=[0,0,0,0,0,0] \to M11=[0,1,1,0,0,0] \to M21=[1,1,1,1,0,0] \to X=[1,1,1,1,1,0],$$

$$X0=[0,0,0,0,0,0] \to M12=[0,0,1,1,0,0] \to M22=[0,1,1,1,1,0] \to X=[1,1,1,1,1,0],$$

$$X0=[0,0,0,0,0,0] \to M13=[0,0,0,1,1,0] \to M23=[1,0,1,1,1,0] \to X=[1,1,1,1,1,0],$$

$$X0=[0,0,0,0,0,0] \to M14=[1,0,0,0,1,0] \to M24=[1,1,0,1,1,0] \to X=[1,1,1,1,1,0],$$

$$X0=[0,0,0,0,0,0] \to M15=[1,1,0,0,0,0] \to M25=[1,1,1,0,1,0] \to X=[1,1,1,1,1,0]\}$$

The corresponding symmetric path, which is the vector average of the points along all paths at the same activation ratios is:

$$SP1: X0=[0,0,0,0,0,0] \to S1=[2/5,2/5,2/5,2/5,2/5,0] \to S2=[4/5,4/5,4/5,4/5,4/5,0] \to X=[1,1,1,1,1,0]$$

FIG. 2 illustrates how cyclic path sets are formed through the connection of cyclic point sets. Using the cyclic set approach is just one way to generate the encircling set. Alternatively, this can be done through other systematic approaches or even through randomization of points.

The selection of path P1 above may be arbitrary or randomized, as long as features are gradually activated while transitioning through the path, while satisfying incremental activation ratios.

Generating an $\alpha$-Linear Set of Encircling Paths

Having already discussed how to generate an $\alpha$-linear path from X0 to X, the following describes an example of how to generate an encircling set of $\alpha$-linear paths. In some embodiments, the encircling set of paths may all be $\alpha$-linear. An embodiment of the process of generating such a set is:
A) Initiate the base-path as P=[X0, X];
B) Generate the encircling path set of P;
C) Go through the transitions in all paths in the encircling path set and split P between points corresponding to two consecutive activation ratios and add a new midpoint if for at least one of the paths in the encircling path set the transition is not $\alpha$-linear.
D) Repeat the step of generating the encircling path set P until all transitions are $\alpha$-linear.

Calculating the Overall Feature Contributions to the Prediction

Once we have an $\alpha$-linear set of encircling paths, we can calculate the feature contribution gradients to each of these paths using Eq. 12. The overall feature contributions to the prediction, or the prediction explanation, is the vector average of all of these feature contributions. The whole process can be considered as the estimation of the feature contributions to the symmetric path connecting X0 to X. For each activation ratio, we have a set of points coming from all generated encircling paths that have a vector average corresponding to the symmetric point with the same activation ratio. This symmetric path efficiently represents all paths connecting X0 to X thanks to Lemma 2, even though we have not traversed all paths.

The Cumulative Features Contributions to the Path

Calculating Eq. 12 in a cumulative fashion for each feature, provides an insight into how each feature contributes to the overall prediction at each activation ratio. In other words, it shows the contribution of each feature when A fraction of the features are active. This is much more manageable and understandable that evaluating all $2^N$ possible feature correlations. Plotting all cumulative contributions vs. the activation ratio $\lambda$ results in what we call the contribution progression plot. This adds a new dimension to prediction explanation and also makes explanation more actionable by demonstrating the feature contribution shares along the symmetric path to the target point. This answers the question of which feature contributes how much at which activation ratio, through only N curves.

Features

Dynamic Path Generation

DyGEst dynamically generates symmetric paths whose resolution of points are a function of the desired explanation accuracy tuned by parameter a as well as the extent of the linearity of the prediction model $f$. The density of points along the path is not necessarily uniform: wherever the function behaves more linearly, the density of points will be lower, as fewer points are required to achieve $\alpha$-linearity. Higher non-linearities however (and higher a values) correspond to a higher density of points.

Incremental Improvement of Explanations

If after producing model explanations for a specific a level, a higher resolution is desired for the whole dataset or a sub-set of the original dataset, this can be done incrementally by improving the available explanations and using the previous computations. The process is re-evaluating the available cyclic paths and dynamically adding more midpoints to them whenever the new $\alpha$-linearity criterion is violated, until it is not.

The Explanation Vs. Activation Ratio Chart

Another exciting feature of DyGEst is that, for each explained prediction we can visualize the progression of feature contributions through exploring the cumulative gradient at different activation ratios from the reference point to the destination point. This feature brings a new dimension to prediction explanation that has not been explored before. The resolution of this curve can be adjusted by choosing different values for a.

Applicability to Both Classification and Regression Models

On the input side, DyGEst can accept binary, real, or even categorical inputs. The output can be real numbers, probability values, or even hard classification results (numbers 1 or 0). All the steps described do not impose any specific limitations on the input/output value ranges.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A computer implemented method for improving an accuracy of a machine learning model, comprising:
   receiving, by a computer processor, an input data point 'X' representing a target value;
   executing, by the computer processor an explanation engine to determine a symmetric path from a reference point 'X0' to the input data point 'X', wherein the symmetric path represents contributions from features in a feature space of a prediction model;
   calculating, by the explanation engine, a contribution of an intercept as the machine learning model output value at the reference point in the feature space;
   updating, by the explanation engine, the symmetric path and increasing a number of points of the symmetric path based on the calculated contribution;
   generating, by the explanation engine, an encircling path set from the updated symmetric path, wherein the encircling path set comprises points with binary elements whose vector mean equals a symmetric point;
   calculating, by the explanation engine, a feature contributions gradient for each path in the encircling path set;
   evaluating, by the explanation engine, an $\alpha$-linearity of all paths in the encircling path set;
   dynamically adding, by the explanation engine, intermediary points between the reference point and the input data point based on determining transitions where the $\alpha$-linearity of at least one of the paths at a corresponding activation ratio is violated, wherein the added intermediary points are symmetric about the base path;
   determining, by the explanation engine, whether a threshold accuracy of prediction is produced by the prediction model, wherein the threshold accuracy is determined based on dynamic estimation of local linearity of the prediction model and corresponding partial feature contributions; and
   reiterating, by the explanation engine, the dynamic addition of intermediary points until the threshold accuracy is reached.

2. The method of claim 1, further comprising determining whether a minimum number of paths in the encircling path set are $\alpha$-linear and automatically adding the intermediary points in the event the minimum number of paths are not $\alpha$-linear.

3. The method of claim 2, wherein the minimum number of paths are all paths in the encircling path set.

4. The method of claim 2, wherein the added intermediary points are selected based on determining transitions where an $\alpha$-linearity of at least one of the paths at a corresponding activation ratio is violated.

5. The method of claim 1, further comprising performing gradient scaling on the paths in the encircling path set.

6. A computer program product for improving an accuracy of a machine learning model output, the computer program product comprising:
   one or more non-transitory computer readable storage media, and program instructions collectively stored on the one or more computer readable storage media, the program instructions executable to:
   receive, by a computer processor, an input data point 'X' representing a target value;
   execute by the computer processer, an explanation engine to determine a symmetric path from a reference point 'X0' to the input data point 'X', wherein the symmetric path represents contributions from features in a feature space of a prediction model;
   calculate by the explanation engine, a contribution of an intercept as the machine learning model output value at the reference point in the feature space;
   update, by the explanation engine, the symmetric path and increasing a number of points of the symmetric path based on the calculated contribution;
   generate, by the explanation engine, an encircling path set from the updated symmetric path, wherein the encircling path set comprises points with binary elements whose vector mean equals a symmetric point;
   calculate by the explanation engine, a feature contributions gradient for each path in the encircling path set;
   evaluate, by the explanation engine, an $\alpha$-linearity of all paths in the encircling path set;

dynamically add, by the explanation engine, intermediary points between the reference point and the input data point based on determining transitions where the α-linearity of at least one of the paths at a corresponding activation ratio is violated, wherein the added intermediary points are symmetric about the base path;

determine by the explanation engine, whether a threshold accuracy of prediction is produced by the prediction model, wherein the threshold accuracy is determined based on dynamic estimation of local linearity of the prediction model and corresponding partial feature contributions; and reiterate, by the explanation engine, the dynamic addition of intermediary points until the threshold accuracy is reached.

7. The computer program product of claim 6, wherein the program instructions are executable to further determine whether a minimum number of paths in the encircling path set are α-linear and automatically add the intermediary points in the event the minimum number of paths are not α-linear.

8. The computer program product of claim 7, wherein the minimum number of paths are all paths in the encircling path set.

9. The computer program product of claim 7, wherein the added intermediary points are selected based on determining transitions where an α-linearity of at least one of the paths at a corresponding activation ratio is violated.

10. The computer program product of claim 6, wherein the program instructions are executable to further perform gradient scaling on the paths in the encircling path set.

* * * * *